July 14, 1942.   E. P. PAXMAN   2,289,991
TRANSMISSION GEAR FOR ENGINES
Filed Dec. 6, 1939   2 Sheets-Sheet 1

INVENTOR
EDWARD PHILIP PAXMAN
By Norris & Bateman
ATTORNEYS

July 14, 1942.  E. P. PAXMAN  2,289,991

TRANSMISSION GEAR FOR ENGINES

Filed Dec. 6, 1939  2 Sheets-Sheet 2

INVENTOR
EDWARD PHILIP PAXMAN
By *Norris & Bateman*
ATTORNEYS

Patented July 14, 1942

2,289,991

UNITED STATES PATENT OFFICE 2,289,991

TRANSMISSION GEAR FOR ENGINES

Edward Philip Paxman, Colchester, England

Application December 6, 1939, Serial No. 307,889
In Great Britain December 9, 1938

6 Claims. (Cl. 74—298)

This invention relates to engine control gear and has particular although not exclusive reference to gearing employed on marine engines and capable of providing ahead, neutral and astern positions.

In the design of modern high speed craft it is essential that all engine components shall be of the lightest possible weight and occupy the minimum amount of space and also that the crank system and moving masses of the engine shall be isolated torsionally from the remaining masses of the gear casing, propeller shaft and associated parts.

The object of the present invention is to provide an improved form of engine control gear which will fulfill the requirements set out above and at the same time provide for the transmission of full engine power when running ahead, for the transmission of low power at reduced revolutions when running astern, for a neutral position and finally for trailing a propeller freely when the engine is stopped.

According to the invention an engine control gear is provided wherein a torsionally resilient or flexible coupling has one element mounted on an engine crank shaft and a second element mounted on a propeller or other driven shaft, the said coupling being constructed to house concentrically within it the components of a clutch through which the drive is transmitted when running ahead and/or under fuel power transmission. In this construction the coupling acts in conjunction with the driven components as a vibration damper isolating the moving engine parts torsionally from the said driven components.

According to the preferred form of the invention the improved engine control gear comprises in combination a main shaft disposed in alignment with an engine crank shaft, a housing carried by said crank shaft, a flexible or resilient coupling having one set of components mounted on said housing and the complementary components mounted on an element carried by a sleeve rotatable relatively to said main shaft and carrying also driving clutch members arranged within said housing, driven clutch members movably mounted between said driving clutch members on a cylinder carried by said main shaft, an epicyclic gear train surrounding said sleeve for reverse driving purposes and means under hand control for distributing oil under pressure to the inner or outer faces of the driven clutch members to force them into or out of operative positions.

Reference will now be made to the accompanying drawings which illustrate by way of example an engine transmission gear constructed according to the invention and in which.

Figure 1:
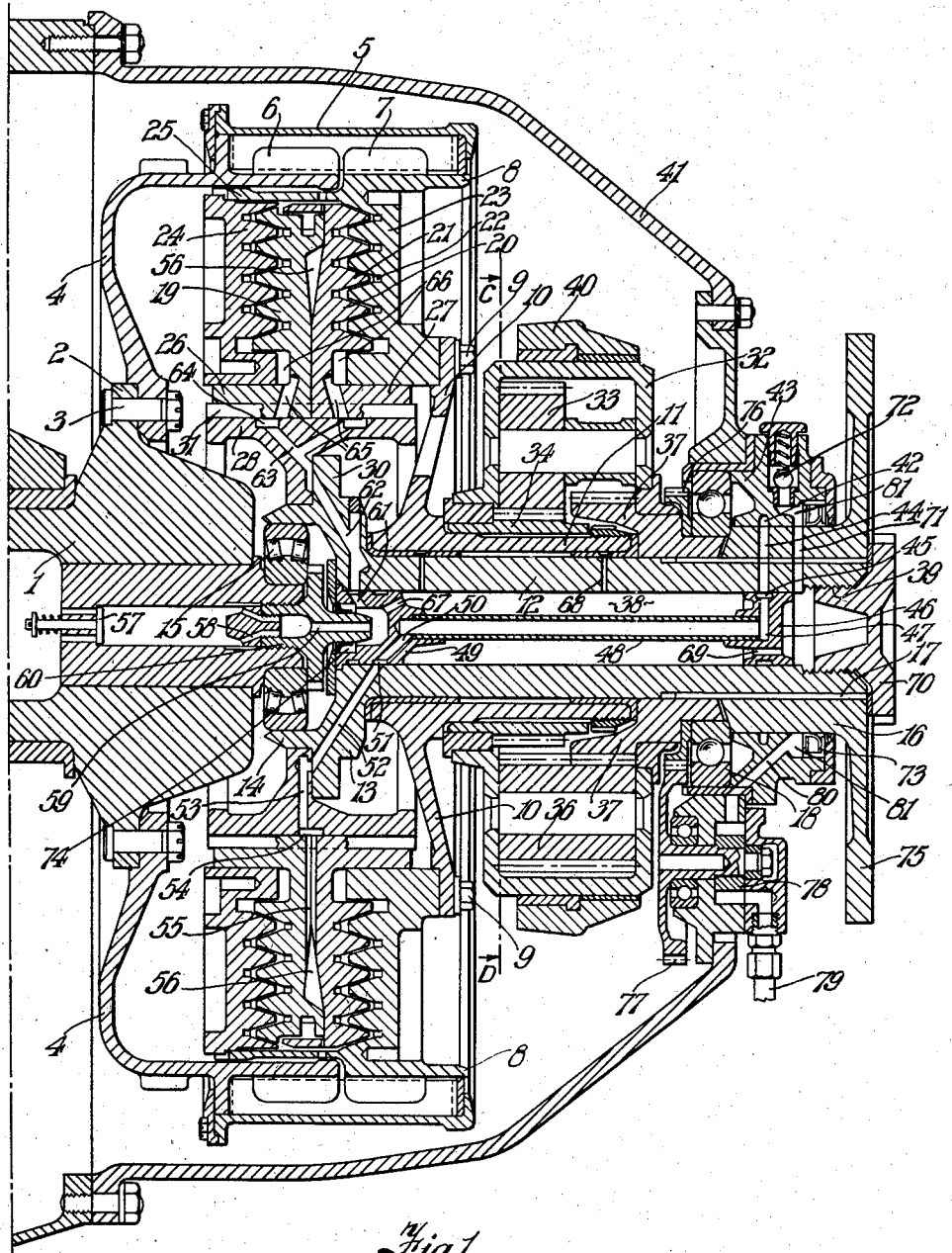
Fig. 1 is a longitudinal sectional elevation showing the clutch in the open position and with a section of the gear casing taken on the line A—B of Fig. 3.
Figure 2:
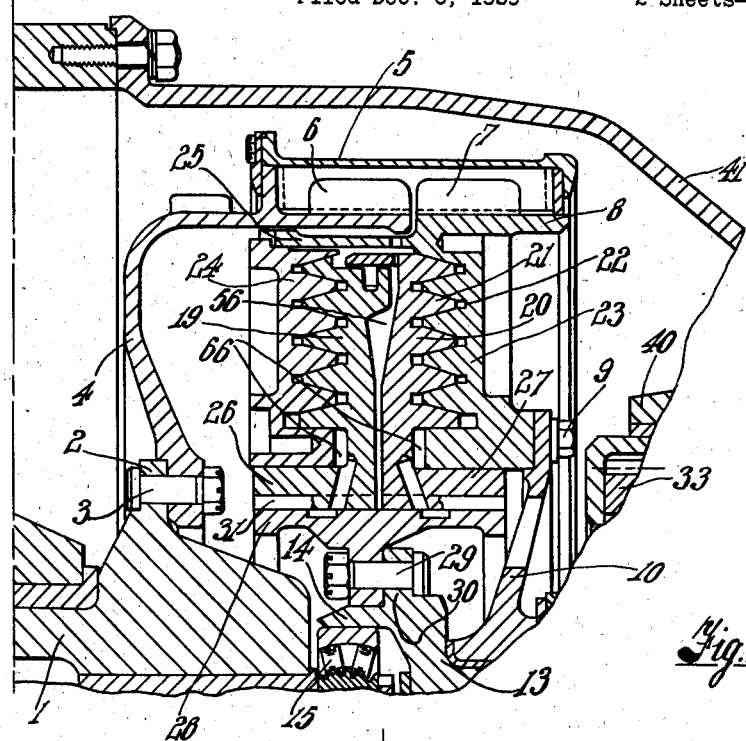
Fig. 2 is a fragmentary sectional elevation showing the clutch in the engaged position and Fig. 3 is a sectional elevation of the epicyclic gear and its casing taken on the line C—D of Fig. 1.

The construction illustrated shows the application of the invention to the control gear of a marine engine whose crank shaft is indicated at 1. The end of this shaft has a flange 2 to which is fixed by means of bolts 3 an annular housing 4 carrying externally a cylindrical casing 5 within which is fixed the driving component 6 of a spring or flexible coupling of known type as shown for example in British Patent No. 160,593, designed to reduce torsional vibrations. The second component 7, of said coupling is also disposed within the casing 5 but is carried on the periphery of an annulus 9 fixed by means of bolts 9 to a flange 10 formed integral wth a sleeve 11 mounted freely around a main or propeller operating shaft 12 disposed in axial alignment with the engine crank shaft 1. The shaft 12 is formed at its inner end with a flange 13 terminating in an annulus 14 engaged by a spigot roller bearing 15 carried by the end of the crank shaft 1, said bearing being provided to allow free rotation of the shaft 12 relatively to the crank shaft as well as slight angular displacements of the shaft 12 relatively to the crank shaft. The outer end of the shaft 12 has a sleeve 16 fixed to it by means of splines 17 and this sleeve is carried in a main ball bearing 18.

Mounted within the housing 4 are the annular components of a clutch device of the fluid pressure operated type, the driving clutch member being operated by the driven member 7 of the said flexible coupling. In the construction illustrated, the driven clutch members comprise a pair of annular plates 19 and 20 each formed with tapered annular ribs 21 on its outer surface adapted to engage correspondingly shaped annular grooves 22 formed in driving clutch members 23 and 24, the member 23 being fixed to or formed integral with the annulus 8 and having a cylindrical extension 25 into which the clutch member 24 is fitted. The two driven clutch members 19 and 20 are arranged in known manner, to be forced apart by the introduction of fluid under pressure, such as oil, between them. For this purpose the plates are formed integral with cylindrical sleeves 26 and 27 respectively, both sleeves being slidable in directions parallel to the axis of the crank shaft 1 on a cylinder 28 fixed by bolts 29 to a peripheral flange 30 formed on the annulus 14. The said clutch members 19 and 20 are engaged by splines 31 carried by the cylinder 28 to prevent relative rotation whilst permitting the aforesaid sliding movements. The driven clutch members, therefore, rotate always in unison with the shaft 12.

Figure 3:
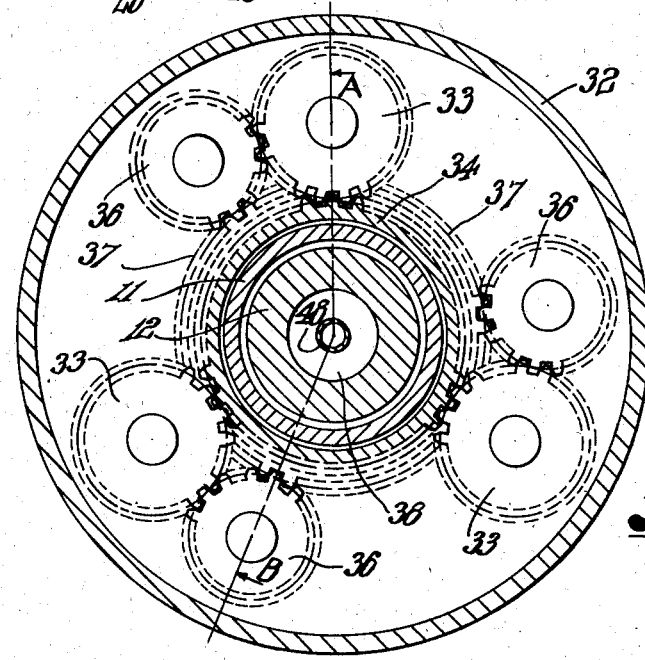

Surrounding the sleeve 11 is a casing 32 containing epicyclic pinions 33 meshing with a central pinion 34 on the sleeve. Meshing with the pinions 33 is a second set of pinions 36 which extend the width of the casing and also engage a sun gear 37 of larger diameter than the pinion 34, said sun gear 37 being fixed to the sleeve 16 which is in turn fixed to the main shaft 12 (see Figs. 1 and 3). Surrounding the casing 32 is a braking device 40 adapted to hold the said casing against rotation, when required, as hereinafter described. The construction and operation of this braking device may be like that shown and described in British Patent No. 220,021.

The mechanisms above described are disposed within an outer casing 41 contiguous to the engine crank case and externally of this outer casing are disposed the means for introducing oil for the normal operation of the clutch members. The engine is under hand control from a bridge or other control position and when the control device is in the "ahead" position oil under pressure is supplied from a pump to an inlet (not shown) communicating with an annular passage 42 in a portion 43 of the casing which supports the main bearing 18. The annular passage 42 communicates by means of radial passages 44 passing through the sleeve 16 and shaft 12, with an annular passage 45 formed around a plug 46 fixed within the hollow portion 38 of the shaft 12, the said passage 45 communicating by means of further ports 47 with a tube 48 extending axially of the shaft 12 and mounted at its inner end in a second plug 49 which has inclined radial ports 50 by which the tube 48 communicates with an annular passage 51 passing around the periphery of the plug. Communicating with the passage 51 are inclined radial passages 52 formed in the shaft 12 and its flange 13, which passages in turn communicate with passages 53 formed radially in the cylinder 28, whose outer ends open into a groove 54 formed around the said cylinder. In communication with the groove 54 are radial passages 55 formed between the driven clutch members 19 and 20 and communicating with an annular space 56 also formed between said clutch members.

A second oil supply comes through the interior of the crank shaft 1, past a non-return valve 57, through ports 58 and 59 in a plug 60 fixed in the outer end of the said crank shaft to the interior of the plug 49. Some of the oil then passes through ports 61 in the plug 49, passages 62 in the shaft 12 and flange 13, branch passages 63 in the cylinder 28 to grooves 64 in the periphery of said cylinder. These grooves communicate through ports 65 in the driven clutch members 19 and 20 with annular spaces 66 between the driving and driven clutch members. Another part of the oil entering the interior of the plug 49 passes through ports 67 therein and flows through the interior passage 38 of the shaft 12, some of the oil entering lubrication ports 68 and the remainder passing through ports 69 in the plug 46 into the space between said plug and an outer closure plug 70. From this space the oil passes through ports 71 in the shaft 12 and sleeve 16, past a relief valve 72 and from thence to the casing by a passage, not shown. Leakage of oil along the exterior of the sleeve 16 is prevented by a sealing device 73 and leakage of oil from the interior of the plug 49 is prevented by a similar form of sealing device 74.

The sleeve 16 terminates in a flange 75 through which the drive is transmitted to the propeller shaft and the sleeve and flange are prevented from moving relatively along the shaft 12 by the plug 70 which has screw-threaded connection, as shown at 39, with the interior of the shaft 12.

The sleeve 16 carries a toothed pinion 76 meshing with a toothed wheel 77 mounted on the spindle of a pump 78 adapted to withdraw oil from the engine crank case through a pipe 79 and deliver oil through a passage 80 into an annular space 81 from which it can pass through ports 71 to the interior of the shaft 12 and, when only the pump 78 is operating, oil is supplied to those parts already described as being normally fed from the interior of the crank shaft 1.

The operation of the gearing described above is as follows:

When the control device is turned to the "ahead" position oil is admitted through the port 42 and passes by way of the tube 48 and the ports and passages 50, 51, 52, 53, 54 and 55 to the space 56 between the driven clutch members 19 and 20 which are thereby forced apart into operative engagement with the driving clutch members 23 and 24. With the engine running, the drive is then transmitted through the said clutch members to the cylinder 28, the flange 30, the main shaft 12, sleeve 16 and element 75 to the propeller.

When the control device is moved to any but the "ahead" position the supply of oil under pressure to the annular space 56 ceases and the driven clutch members 19 and 20 are no longer urged into their operative positions. Under these conditions, however, oil passes from the crank shaft 1 through the ports 58 and 59 and 61, passages 62 and 63, ports 64 and 65 to the annular spaces 66 where this oil under pressure acting on the outer faces of the driven clutch members forces them together to maintain the clutch mechanism inoperative. With the engine running a reverse drive is then obtained from the crank shaft 1 through the flexible coupling device 6 and 7, the clutch members 23 and the flange 10 to sleeve 11 which can rotate freely around the shaft 12. The drive is transmitted from the sleeve 11 through the gears in the casing 32, the braking device 40 being rendered operative to hold the said casing stationary. This causes the pinions 33 and 36 to transmit a reverse drive through sun gear 37 and sleeve 16 to the main shaft 12.

For the "neutral" position with the engine running, the clutch members 19 and 20 are again held inoperative by pressure applied to their outer faces in the annular spaces 66 and the drive takes place as before to the pinion 34 of the gear box but as the band brake 40 is not applied the gears rotate idly around the pinion 37 and no rotation is transmitted to the shaft 12 and the propeller.

When the engine is stopped altogether the propeller can trail freely and causes through the sleeve 16 operation of the pump 78 which will then withdraw oil from the crank case and supply it to the interior of the shaft 12, the nonreturn valve 57 preventing the passage of this oil into the interior of the crank shaft. The oil will, therefore, find its way through the ports 67 and 61, passages 62 and 63, ports 64 and 65 to the spaces 56 to hold the clutch members inoperative.

Under all conditions oil is acting on the external surfaces of the driven clutch members, such oil being derived from the interior of the crank shaft or from the trailing pump 78. When the control is moved to the "ahead" position however, the oil supplied to the space 56 is at a pressure sufficient to overcome the pressure on the external surfaces of the clutch members 19 and 20 so that these members are then moved into their engaged positions.

It will be understood that various modifications can be made in the arrangement above described without departing from the invention. For example, any suitable form of clutch mechanism can replace the members 19, 20, 23, and 24 and any known form of reversing gearing can replace the epicyclic gears shown.

I claim:

1. An engine control mechanism having a driving shaft and a driven shaft having an inner end adjacent to and aligned with an end of said driving shaft, the mechanism comprising a torsionally flexible coupling straddling the adjacent ends of said shafts and having one element mounted on said driving shaft and a second element mounted on said driven shaft contiguous to the inner end thereof, a clutch device mounted concentrically within said flexible coupling and straddling the adjacent ends of said shafts and comprising driving clutch members fixed to the second coupling element and driven clutch members movably mounted upon and rotatable with said driven shaft, said driven shaft being driven through the clutch mechanism when running under full power transmission, and means mounted on said driven shaft contiguous to the point of mounting thereon of said second coupling element to transmit a reverse running drive from the second coupling element through at least one of said driving clutch members to the driven shaft.

2. An engine control mechanism according to claim 1 having means including fluid passages leading to the inner end of the driven shaft to admit pressure fluid to force the driven clutch members into engagement with the driving clutch members in the "ahead" position and to force the driven clutch members to inoperative positions in the "reverse" and "neutral" positions.

3. An engine control mechanism according to claim 1 having a cylindrical element on the driven shaft overhanging the adjacent ends of said shafts and mounting the driven clutch members thereon, a sleeve rotatable relatively to the driven shaft and extending at one end into the portion of said cylinder which overhangs the inner end of the driven shaft for mounting one of the driving clutch members, and a gear train mounted on the other end of said sleeve to transmit rotation from said sleeve to said driven shaft.

4. An engine control mechanism according to claim 1 having a sleeve rotatably mounted on the driven shaft and extending at one end into the coupling, and an epicyclic gear train disposed concentrically with said driven shaft and surrounding the other end of said sleeve, and a sleeve fixed on the driven shaft and mounting the driven element of said gear train.

5. An engine control mechanism according to claim 1 including a gear box forming part of said means, and a brake band cooperative with the periphery of said gear box for holding the latter stationary when a reverse drive is required.

6. An engine control mechanism comprising in combination an engine crank shaft, a driven shaft disposed in alignment with said engine crank shaft and having an inner end adjacent to an end of said crank shaft, a housing carried by said crank shaft, a flexible coupling having one set of components mounted on said housing and complementary components, an annular flange fixed to the inner end of the driven shaft and having a bearing engaging the adjacent end of the crank shaft, a sleeve rotatable relatively to said driven shaft and extending into said coupling, an element carried by the portion of said sleeve which extends into the coupling and supporting said complementary components, driving clutch members carried by said sleeve and arranged within said housing, a cylinder within the coupling and mounted on said flange on the driven shaft, driven clutch members movably mounted on said cylinder between said driving clutch members on and rotatable with said cylinder, a gear train surrounding and geared to a portion of said sleeve which projects from the coupling for reverse driving purposes, and means under hand control for distributing fluid under pressure through said cylinder to the inner or outer faces of the driven clutch members to force them into or out of operative positions.

EDWARD PHILIP PAXMAN.